United States Patent [19]

Sasano et al.

[11] 4,214,992
[45] Jul. 29, 1980

[54] WATER COLLECTING AND DISTRIBUTING APPARATUS DISPOSED IN A LOWER PORTION OF HIGH SPEED FILTER BASIN

[75] Inventors: Kenji Sasano, Chiba; Ichiro Shiramasa, Tokyo, both of Japan

[73] Assignee: Mitsui Engineering and Shipbuilding Co., Ltd., Tokyo, Japan

[21] Appl. No.: 931,429

[22] Filed: Aug. 7, 1978

[30] Foreign Application Priority Data

Aug. 12, 1977 [JP] Japan .......................... 52-107841[U]

[51] Int. Cl.$^2$ ....................... B01D 23/16; B01D 23/20
[52] U.S. Cl. ..................................... 210/274; 210/293
[58] Field of Search ................. 210/274, 275, 291, 293

[56] References Cited
U.S. PATENT DOCUMENTS

| 801,810 | 10/1905 | Parmelee | 210/274 |
|---|---|---|---|
| 2,710,692 | 6/1955 | Keyel et al. | 210/274 |
| 3,110,667 | 11/1963 | Stuppy | 210/275 |
| 3,468,422 | 9/1969 | Camp | 210/274 |
| 3,925,202 | 12/1975 | Hirs | 210/275 X |
| 4,065,391 | 12/1977 | Farabaugh | 210/274 |

FOREIGN PATENT DOCUMENTS 202235 4/1939 Switzerland ............................ 210/274

Primary Examiner—Charles N. Hart
Assistant Examiner—E. Rollins Cross
Attorney, Agent, or Firm—Armstrong, Nikaido, Marmelstein & Kubovcik

[57] ABSTRACT

A water collecting and distributing apparatus capable of collecting filtrate, distributing raw water, supplying back wash water and dispersing scouring air, which is disposed in a lower portion of a high speed filter basin, is disclosed. This apparatus comprises a plurality of blocks regularly arranged in the bottom portion of the filter basin, each block having a flow passage for air and water in the central portion thereof and a water dispersing chamber located adjacent to the flow passage. A communication hole is formed in a partition wall between the flow passage and the water dispersing chamber, and an injection hole is formed in each of the top wall of the flow passage and the top wall of the water dispersing chamber. The numbers and diameters of the communication holes and injection holes in the blocks and positions of these holes are arranged so that a certain relation is established among them. In each block, the flow passage is formed to have a trapezoidal sectional shape.

5 Claims, 5 Drawing Figures

WATER COLLECTING AND DISTRIBUTING APPARATUS DISPOSED IN A LOWER PORTION OF HIGH SPEED FILTER BASIN

BACKGROUND OF THE INVENTION (1) Field of the Invention

The present invention relates to an improvement in the water collecting and distributing apparatus disposed in a lower portion of a high speed filter basin.

(2) Description of the Prior Art

FIG. 1 of the accompanying drawing shows a conventional apparatus for collecting and distributing water, disposed in a lower portion of a high speed filter basin. The lower portion of the water collecting and distributing apparatus is constructed by a filter medium or filter layer 2, a gravel layer 3 and hollow blocks 4 arranged below these layers 2 and 3. Each block 4 has a number of holes in the top wall thereof. Reference numeral 5 represents a dam for collecting filtrate or clarified water, the numeral 6 represents a conduit for distributing back wash water for washing away suspended substance, colloidal substance and solids adhering to the filter medium 2, and the reference numeral 7 represents a trough for supplying raw water containing suspended substance, colloidal substance and solids to be removed by filtration. In this conventional water collecting and distributing apparatus for a filter basin, while raw water or dirty water supplied to the filter basin passes through the filter medium 2 and gravel layer 3, suspended substances, colloidal substances and solids contained in the raw water or dirty water adhere to the filter medium 2 and are thus removed from the water, and the filtrate is collected from holes formed in the top walls of the blocks 4 through the interior of the blocks 4, discharged to the outside of the basin and applied to an appropriate use. If the filtration is conducted continuously for a certain length of time, solids and other substances become deposited and accumulated in the filter medium 2 to reduce the filtration capacity. In order to restore the original filtration efficiency, the filter medium 2 is washed by flowing water from the water distributing conduit 6 to the gravel layer 3 and the filter medium 2 through the interiors and top wall holes of the blocks 4 in a direction reverse to the water-flowing direction in the filtration operation. With the conventional apparatus under consideration, it certainly is feasible to collect the clarified water or filtrate and to distribute wash water for cleansing the filter media. However, it is inoperable in cleansing the filter medium to send air from inside the block 4 through holes in the upper wall thereof and the filter medium and thereby have the solids or the like attached or accumulated onto the filter medium floated with bubbles of the air or contacted with the air to undergo oxidation. To carry out such scouring with air, unavoidable is to provide an air supply piping and accordingly an increase in the cost of construction of the apparatus. If air pipes are formed by using a metallic material, they are corroded or massive rusts are formed, and therefore, the pipes are readily damaged or clogged. If air pipes are formed by using a concrete material or the like, they are readily made brittle or worn away. Accordingly, when air pipes of a metallic material or concrete are disposed separately, it is difficult to operate the water collecting and distributing apparatus stably for a long time.

SUMMARY OF THE INVENTION

According to the water collecting and distributing apparatus of the present invention, which is disposed in a lower portion of a filter basin, not only collection of filtered water or filtrate and distribution of raw water or back wash water but also dispersing of scouring air can be accomplished. For attaining this, a flow passage for water and air and a water dispersing chamber are formed in blocks disposed in the lower portion of the filter basin, and appropriate holes are formed in the partition wall between the flow passage and dispersing chamber and the top walls of the flow passage and dispersing chamber in each block. Further, the flow passage is formed to have a trapezoidal sectional shape in each block.

It is therefore a primary object of the present invention to provide a water collecting and distributing apparatus for a filter basin, in which not only collection of filtrate, distribution of raw water to be filtered and supply of back wash water, but also dispersing of scouring air can be carried out.

Another object of the present invention is to provide a water collecting and distributing apparatus having a simple structure, in which the operation can be carried out very safely and easily while reducing the equipment and running costs.

Still another object of the present invention is to reduce the height or thickness in the water collecting and distributing apparatus.

A further object of the present invention is to provide a water collecting and distributing apparatus in which adhesion of slime to blocks or corrosion of blocks is prevented by using an anticorrosive material such as procelain or plastics for the formation of blocks to be disposed in the lower portion of a filter basin.

A still further object of the present invention is to provide a water collecting and distributing apparatus in which the strength of blocks is increased by forming them to have a trapezoidal sectional shape and the control of the flow rate of air and/or water passing through flow passages in the blocks can be facilitated.

These and other objects of the invention will be more fully understood from the following description of the invention, on reference to the illustrations appended hereto.

DETAILED DESCRIPTION OF THE PREFERRED EMBODIMENT

Figure 1:
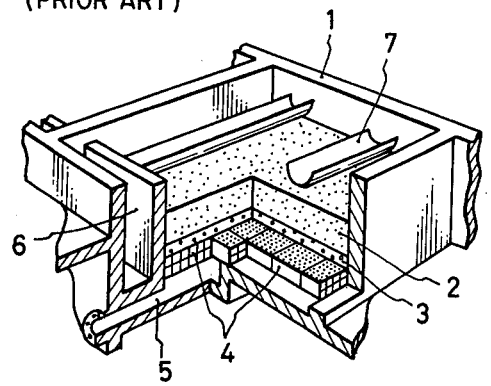
FIG. 1 is a partially cut-out perspective view, illustrating a conventional water collecting and distributing apparatus to be disposed in a lower portion of a filter basin.
Figure 2:
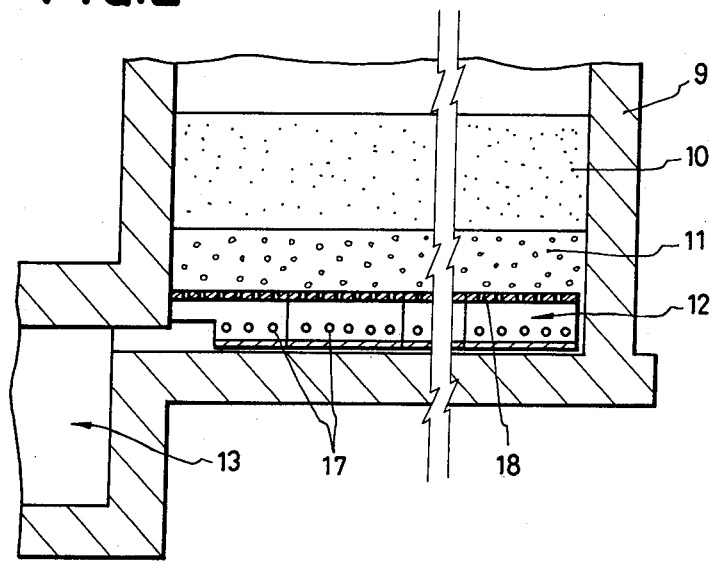
FIG. 2 is a longitudinally sectional view, showing one embodiment of the water collecting and distributing apparatus of the present invention to be disposed in a lower portion of a filter basin.

Referring to FIG. 2 illustrating one embodiment of the apparatus of the present invention, blocks 12 of an anticorrosive material (for example, porcelain or plastics) are arranged and and aligned regularly in one direction in the bottom portion of a filter basin 9, and a gravel layer 11 is formed on the blocks 12 and a layer of a filter medium 10 is formed on the gravel layer 11. A water collecting dam 13 is disposed to collect filtrate therein.

Figure 3:
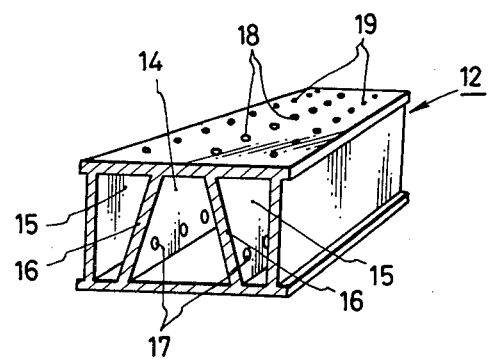
FIG. 3 is a perspective view showing a block to be used for the apparatus of the present invention.

Referring to FIG. 3, a flow passage 14 for air and water is formed at the center of the interior of the block 12 and water dispersing chambers 15 are formed on both sides of the flow passage 14. Communication holes 17 are formed in partition walls 16 between the flow passage 14 and dispersing chambers 15. Holes 18 for jetting air and water are formed in the top wall of the flow passage 14 and holes 19 for jetting water alone are formed in the top wall of the dispersing chamber 15. The flow passages 14 for air and water in the respective blocks 12 are gathered to provide one conduit in the terminal or central portion of the filter basin and this conduit is connected to an air introducing pipe and a water introducing pipe (not shown), respectively.

In the water collecting and distributing apparatus to be disposed in the lower portion of a filter basin, in general, in order to carry out washing effectively, it is indispensable to disperse back wash water and scouring air on the entire bottom portion of the filter basin. Accordingly, water or air jetting holes formed on blocks of the water collecting and distributing apparatus are arranged so that a predetermined pressure difference is produced in air or water jetted from these jetting holes and local excess or shortage of jetting is not caused. However, if this pressure difference is too large, a power cost for feeding air or water increases, resulting in an economical disadvantage.

The pressure difference at the jetting hole necessary for uniform dispersing of air or water is about 100 mm $H_2O$ in case of air or about 400 mm $H_2O$ in case of water. Since the specific gravity of air is extremely different from that of water, if air and water are jetted from jetting holes of the same diameter, it is impossible to maintain a desirable pressure difference.

Figure 4:
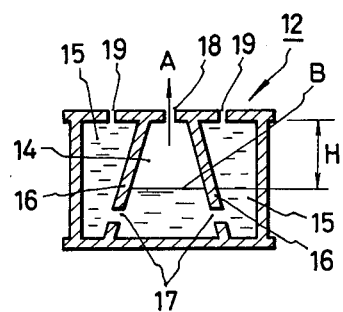
FIG. 4 is a longitudinal sectional view, showing the state of the block where scouring with air is carried out.

Accordingly, in the water collecting and distributing apparatus of the present invention, the diameters of the communicating hole 17 and jetting holes 18 and 19 formed in each block 12 are set according to the following principle:

In case of air scouring to be conducted prior to back washing, as shown in FIG. 4, air A introduced into the flow passage 14 of each block 12 is jetted from the jetting holes 18 formed in the top wall of the flow passage 14 and is dispersed on the entire surface of the bottom portion of the filter basin. The diameter of the jetting hole 18 is adjusted so that a pressure difference of about 100 mm $H_2O$ is maintained. At this point, the hydrostatic level B is located 100 mm below the top wall of the block 12 as shown in FIG. 4. Accordingly, the communication holes 17 formed in the partition walls 16 between the flow passage 14 for water W and air A and the dispersing chambers 15 are located so that the height H from the top wall of the block is larger than 100 mm, whereby a predetermined pressure difference of about 100 mm $H_2O$ can be maintained in the jetting holes 18 and air is discharged only from the jetting holes 18 formed on the flow passage 14.

Figure 5:
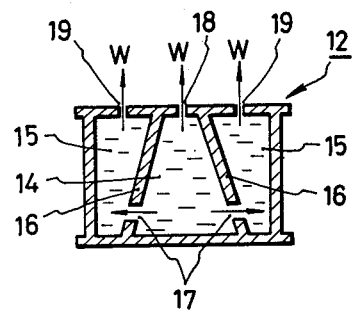
FIG. 5 is a longitudinal sectional view, showing the state of the block where back washing by water is carried out.

When back washing by water is carried out, as shown in FIG. 5, a part of water W introduced into the flow passage 14 is discharged from the above-mentioned jetting holes 18 formed in the top wall of the flow passage, but the majority of water W is introduced into the dispersing chambers 15 through the communicating holes 17 formed between the flow passage 14 and the dispersing chambers 15 and is discharged from the jetting holes 19 for water alone, which is formed in the top wall of the dispersing chambers 15. The diameters of the communcation holes 17 and the water jetting holes 19 are adjusted so that a predetermined pressure difference of about 400 mm $H_2O$ can be maintained, whereby water can be distributed uniformly on the entire surface of the bottom portion of the filter basin.

According to the above-mentioned principle, for example, the diameter of the jetting holes 18 in the top wall of the flow passage 14 is adjusted to 4 mm and about 210 of jetting holes 18 are formed per square meter. The diameter of the jetting holes 19 in the top wall of the dispersing chamber is adjusted to 4 mm and about 1210 of jetting holes 19 are formed per square meter. The diameter of the communication holes 17 is 22 mm and about 16 of the holes 17 are formed per meter.

When the air and water flow passage 14 is formed to have a trapezoidal sectional shape as shown in FIG. 3, the flow rate of air or water can be controlled within an appropriate range when air or water is passed. Furthermore, the strength of the block can be increased if the flow passage is formed to have a trapezoidal sectional shape.

The operations of the water collecting and distributing apparatus having the above-mentioned structure will now be described.

Dirty water or raw water containing suspended substances, colloidal substances and solids, which has been supplied to the filter basin, is passed through the filter medium 10, where the solids and the like are removed during this passage, and filtrate passes through the interior of the blocks 12 from the jetting holes 18 and 19 and is gathered in the water collection dam 13, discharged to the outside of the filter basin and applied to an appropriate use.

When raw water is distributed, the raw water is supplied from the dam 13 and sent through the interior of blocks 12. A part of raw water is introduced into the flow passage 14 and discharged from the above-mentioned jetting holes 18 formed in the top wall of the flow passage, but the majority of the raw water is introduced into the dispersing chambers 15 through holes 17 and is discharged from the jetting holes 19. Then, the raw water is passed through the gravel layer 11 and the filter medium 10, and the solids and the like are removed during this passage, and filtrate passes through a trough (not shown) and discharged to the outside of the filter basin for an appropriate use.

When the filter medium 10 on which solids and the like are deposited and accumulated is scoured by air, air fed under pressure from an air introducing pipe (not shown) is introduced into the flow passage 14 of each block 12 and is jetted and dispersed from the jetting holes 18 formed in the top wall of the flow passage 14. Thus, jetted air is passed through the gravel layer 11 and the filter medium 10 to scour the latter.

When water is flowed in a reverse direction to effect back washing, water fed under pressure from a water introducing pipe (not shown) is introduced into the flow passage 14 of each block, and a part of water is jetted and distributed from the jetting holes 18 in the top wall of the flow passage and the majority of water is jetted from the jetting holes 19 in the top wall of the dispersing chambers 15 through the communication holes 17.

It is most preferred that the water collecting and distributing apparatus of the present invention be disposed in a lower portion of a filter basin or filtration apparatus where secondarily treated water coming from the step of filtration (secondary treatment) of sewage or waste water and still containing suspended substance, colloidal substance and solids is further subjected to a high speed filtration treatment (third treatment). Further, the apparatus of the present invention can be applied to a gravity-type active-carbon filtration apparatus, a fluidized bed type apparatus for removing biochemical nitrogen and like apparatus.

What is claimed is:

1. A water collecting and distributing apparatus to be disposed in a lower portion of a high speed filter basin, said apparatus comprising a plurality of blocks positioned and aligned in the lower portion of the filter basin, a gravel layer formed on the blocks, a filter medium formed on the gravel layer, a water collecting dam for collecting filtrate passing through said blocks, an air introducing means for feeding air to the filter basin through said blocks and a water introducing means for feeding water to the filter basin through said blocks, wherein each said block has a flow passage for air and water formed in the central portion thereof, at least one water dispersing chamber formed adjacent to said flow passage, at least one first communication hole means formed in a partition wall between said flow passage and dispersing chamber, at least one second hole means for jetting air and/or water, formed in the top wall of said flow passage, and at least one third hole means for jetting only water, formed in the top wall of said dispersing chamber.

2. An apparatus as set forth in claim 1, wherein the air and water flow passage formed in the central portion of each block has a trapezoidal sectional shape.

3. An apparatus as set forth in claim 1, wherein each block is formed of an anticorrosive substance.

4. An apparatus as set forth in claim 3, wherein each block is formed of porcelain or plastics.

5. An apparatus as set forth in claim 1 wherein said at least one dispersing chamber is two dispersing chambers, one positioned on each side of said flow passage.

* * * * *